United States Patent [19]

Sisson et al.

[11] 3,902,122

[45] Aug. 26, 1975

[54] APPARATUS FOR SPEEDING-UP THE ATTACK TIME OF A TONE-CODED RADIO RECEIVER

[75] Inventors: Ronald C. Sisson; Frederick E. Spangler, both of Lynchburg, Va.

[73] Assignee: General Electric Company

[22] Filed: July 10, 1974

[21] Appl. No.: 487,147

[52] U.S. Cl. ................. 325/466; 325/474; 325/478

[51] Int. Cl.$^2$ ............................................ H04B 1/06

[58] Field of Search ............................ 325/402–404, 325/410, 474, 477, 478, 480, 466, 322–324, 348

[56] References Cited

UNITED STATES PATENTS

| | | | |
|---|---|---|---|
| 3,564,419 | 2/1971 | Yakish | 325/348 |
| 3,657,655 | 4/1972 | Fukata | 325/466 |

*Primary Examiner*—Albert J. Mayer

[57] ABSTRACT

In a shared-channel communication system a tone-coded radio receiver is unsquelched only when it receives a tone of the proper frequency for that receiver. Usually, the tone is a single audio frequency below the normally used transmitted voice frequency. A frequency selective filter is needed so that a given receiver is unsquelched only in response to a tone of the proper frequency. Such a filter introduces a time delay which may prevent transmitted information from being heard or utilized for a short time at the beginning of the transmission. Thus, important information such as identification or status may be completely lost. The radio receiver is therefore provided with a timing circuit which causes the receiver to become unsquelched for a selected time interval starting at the beginning of a transmission, and extending long enough to permit the receiver to produce the initial information until the frequency selective filter unsquelches the receiver. The receiver may also include means to prevent the initial information from being heard by a user.

3 Claims, 2 Drawing Figures

PATENTED AUG 26 1975

3,902,122

APPARATUS FOR SPEEDING-UP THE ATTACK TIME OF A TONE-CODED RADIO RECEIVER

BACKGROUND OF THE INVENTION

Our invention relates to a tone-coded radio receiver, and particularly to apparatus for speeding-up the attack or response time of such a receiver.

In radio communication, a single frequency or channel may be shared by two or more separate users or enterprises. In order that each user not receive transmissions or signals intended for another user, an identifying and distinctive tone is transmitted by each user. Generally, this tone is a single audio frequency below the normally transmitted and reproduced voice frequencies so that although it is continuously present during a transmission, it is not heard. Each receiver of a user has a frequency selective filter which responds only to the selected tone for that user, and which unsquelches the receiver only when a tone of the proper frequency is received. In this way, a user will not hear transmissions of another user. While the system just described works well and increases the usefulness of radio frequencies, the inherent time delay of the frequency selective filter presents a problem when the initial part of a transmission contains important speech or data information. We have found that in many instances, the time delay of the filter does not permit the receiver to become unsquelched and thereby responsive to the transmission until some part or all of the initial part of a transmission has ended, with the result that important or essential speech or data or information is lost. Where, as is frequent, the speech or data or information provides identification or status of a law enforcement unit, serious results may occur.

Accordingly, a primary object of our invention is to speed-up the response or attack time of a tone-coded radio receiver.

Another object of our invention is to provide a new and useful circuit for a tone-coded radio receiver that eliminates or reduces the time required for the receiver to respond, thereby permitting speech or data in transmission to begin earlier.

Another object of our invention is to provide a new and useful circuit for a tone-coded radio receiver that permits signals to be passed through the receiver for a short time to permit the initial part of a transmission and its information to be reproduced in entirety, and that thereafter permits the frequency selective filter to function for proper tone-coded operation.

SUMMARY OF THE INVENTION

Briefly, these and other objects are achieved in accordance with our invention by a timing circuit that produces a signal of relatively short, selected time duration in response to a received carrier signal. the selected time duration signal is applied to a switching circuit or to some point in the receiver so that the initial information is utilized immediately upon receipt, irrespective of the tone coding that may be present. At some time during this selected time duration, the frequency selective filter of the receiver will produce a tone signal if the proper tone frequency is present, so that when the selected time duration signal ends, the receiver will pass subsequent information, such as speech. The receiver may also have a circuit that prevents a user from hearing noises resulting from the information during the short, selected time duration.

BRIEF DESCRIPTION OF THE DRAWINGS

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF A PREFERRED EMBODIMENT

In the following description, we will first describe a typical tone-coded, frequency modulation radio receiver and the problems present in such a receiver, and we will then describe how our invention overcomes these problems.

BACKGROUND

Figure 1:
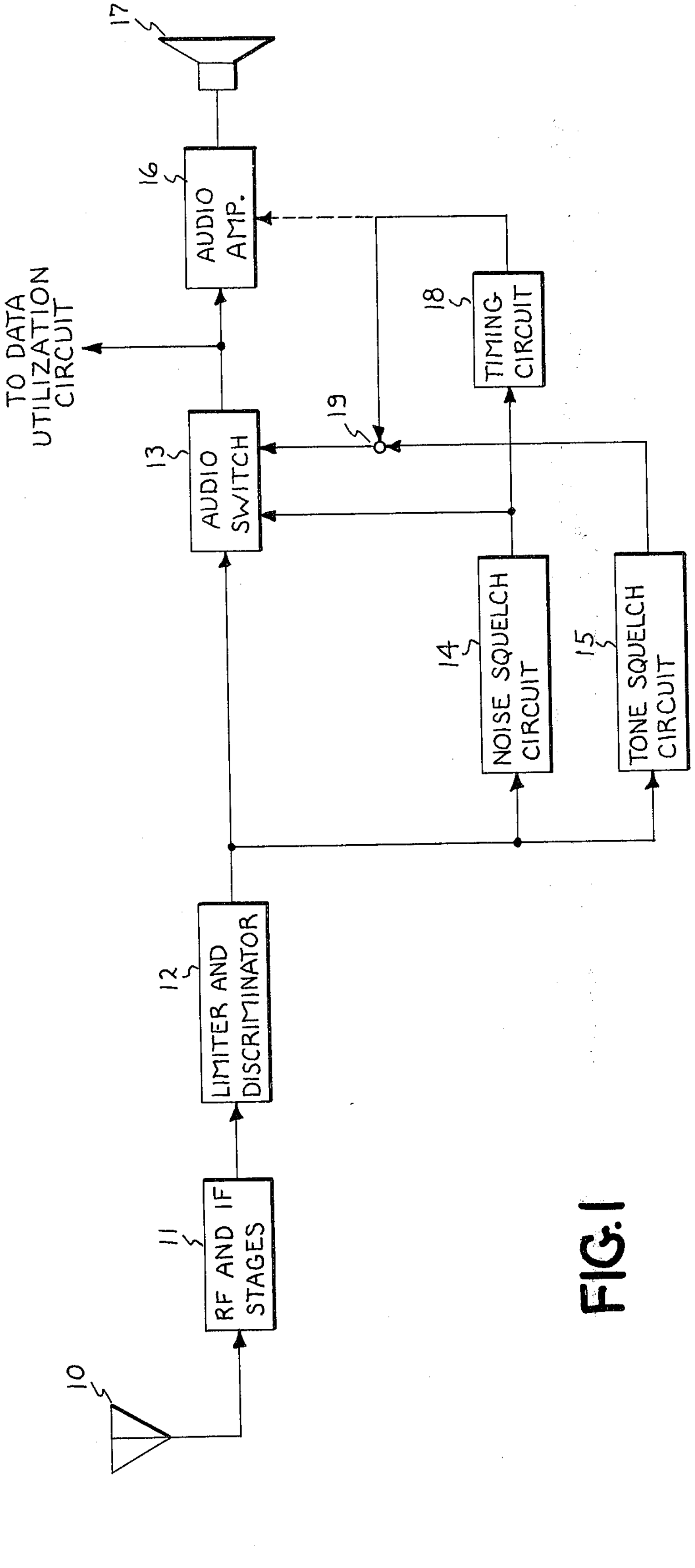
FIG. 1 shows a block diagram of a tone-coded, frequency modulation radio receiver provided with a circuit in accordance with one preferred embodiment of our invention.

FIG. 1 shows a typical, known, tone-coded, frequency modulation receiver. Such a receiver is connected to an antenna 10 which supplies signals to radio frequency (RF) and intermediate frequency (IF) stages 11. These stages 11 provide selectivity and amplification at the received radio frequencies and at the intermediate frequency or frequencies. After this selection and amplification, the signals are applied to an amplitude limiter and discriminator 12 which limits their amplitude and then demodulates them to audio signals. These audio signals are applied to the input of an audio switch 13. The switch 13 has control inputs which, when provided with proper signals from both a noise squelch circuit 14 and a tone squelch circuit 15, unsquelch the receiver and cause the switch 13 to pass the audio signals to the output of the switch 13 which is connected to an audio amplifier 16 and to a data utilization circuit. The amplifier 16 can be coupled to any suitable utilization device, such as a loudspeaker 17. Typically, the receiver reproduces the transmitted voice signals above 300 hertz. The data utilization circuit can be a printer, a computer, a display, or any desired device.

A typical noise squelch circuit, such as the circuit 14, detects noise frequencies above the normal voice frequencies, typically above 5 kilohertz. If these noise frequencies are present, the noise squelch circuit 14 produces a signal that prevents the audio switch 13 from passing audio signals. However, if these noise frequencies fall below a selected amplitude, thus indicating the presence of a carrier, then the noise squelch circuit 14 produces a signal which tends to cause the audio switch 13 to pass audio signals. However, as mentioned, the audio switch 13 also requires the proper signal from the tone squelch circuit 15. The tone squelch circuit 15 comprises a frequency selective filter which is sharply tuned to a single frequency, generally below the amplified voice signals, in the order of 300 hertz or less. If an audio tone of the proper frequency is present, indicating that the particular receiver is to be made responsive, the tone squelch circuit 15 produces a signal at a point 19, and this signal also tends to cause the audio switch 13 to pass audio signals. If the noise squelch circuit 14 produces the proper signal indicating absence of noise or presence of a carrier, and if the tone squelch circuit 15 produces the proper signal indicating the proper tone frequency for the receiver, then the audio switch 13 can pass audio signals.

The noise squelch circuit 14 prevents undesired noise from being heard when no carrier is present, and the tone squelch circuit 15 prevents signals other than those intended for a specific receiver from being heard. Systems using such arrangements as described work well, and increase the efficiency or usefulness of a given channel of the radio frequency spectrum. However, frequency selective filters introduce a time delay, the time delay increasing with frequency selectivity. A typical tone squelch circuit is highly selective, so that it introduces an appreciable time delay, somewhere around 300 milliseconds for a relatively weak signal and somewhere around 250 milliseconds for a very strong signal, both delays being dependent upon the exact tone frequency. If a transmission is provided with a short burst of information or data at the beginning of the transmission, the inherent time delay in the tone squelch circuit 15 will prevent the audio switch 13 from passing signals so that the initial and sometimes critical speech or data information will be lost. Thus, if the initial speech or data information is needed to show the identification of a transmitter or the status of the user of the transmitter, a feature frequently used in police work, very significant or essential information is lost. Such a loss can result in damage or harm to property or people.

Figure 2:
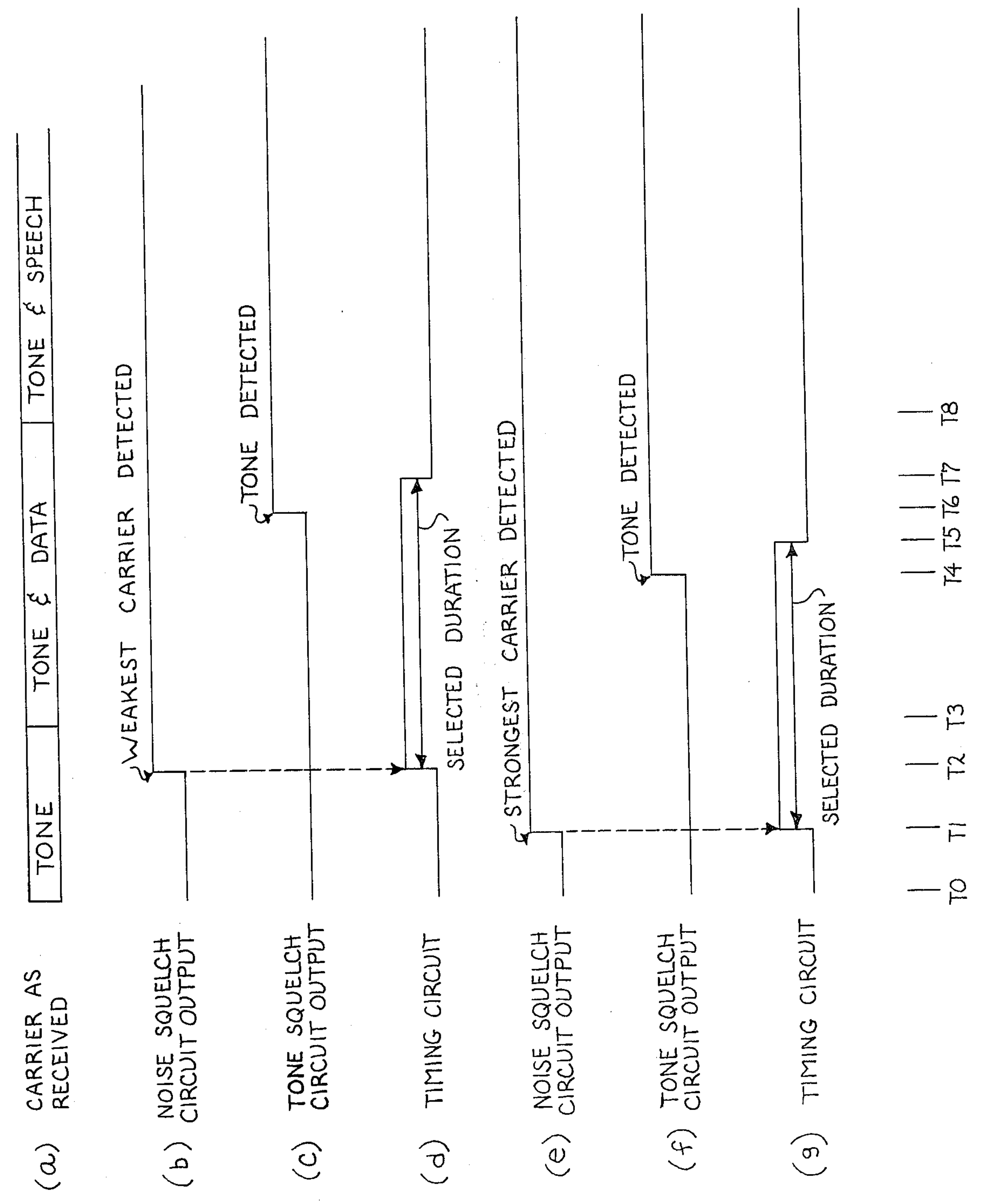
FIG. 2 shows timing diagrams for explaining the operation of our circuit as used with a tone-coded, frequency modulation radio receiver.

FIG. 2 shows timing diagrams, plotted along a common time axis, to illustrate an example of the problems just discussed. In FIG. 2*a*, we have shown the make-up of a received carrier beginning at the time T0. This carrier includes the identifying tone from the beginning. Early in the transmission, at the time T3 (typically 140 milliseconds after the time T0), a short burst (typically 240 milliseconds long) of data (such as identification or status) is transmitted. This data continues until the time T8, after which voice signals are transmitted. The tone is present at all times. FIG. 2*b* shows the output of the noise squelch circuit 14 for what we have assumed to be the weakest possible carrier. The noise squelch circuit 14 requires some length of time until it produces an output at the time T2 (typically 100 milliseconds after the time T0) to indicate absence of noise or presence of signals. In FIG. 2*c*, we have shown the output from the tone squelch circuit 15 for the same weak carrier, and it will be seen that tone will not be produced at the output of the circuit 15 until the time T6 (typically 300 milliseconds after the time T0). Since detection of the carrier and detection of the tone are both needed in order for the audio switch 13 to pass signals, and since the tone is not detected until the time T6, it will be seen that most, if not all, of the data information with the received carrier of FIG. 2*a* will be lost. An alternative would, of course, be to delay the beginning of the data at the time T3 for several hundred milliseconds. However, such delay is not desirable.

FIGS. 2*e* and 2*f* show outputs of the noise squelch circuit 14 and the tone squelch circuit 15 when the strongest assumed carrier is received. In these figures, it will be seen that the carrier is detected at the time T1 (typically 50 milliseconds after the time T0) and the tone is detected at the time T4 (typically 250 milliseconds after the time T0), both of which are sooner than the detections of carrier at the time T2 and tone at the time T6, for a weak carrier. However, again with reference to FIGS. 2*e* and 2*f*, it will be seen that even with a strong carrier, it is possible for the tone to be undetected until data is already being transmitted, with the result that it is still possible to lose some of this data. Accordingly, to avoid delaying the time T3 at which the data can be started, some means is needed to speed up the response or attack time of the radio receiver described thus far in connection with FIG. 1.

INVENTION

In order to speed up the response or attack time, we provide a timing circuit 18. The timing circuit 18 may take almost any form as long as it is able to produce a pulse or signal of selected time duration in response to a signal at its input. The input of the timing circuit 18 is connected to the output of the noise squelch circuit 14, and the output of the timing circuit 18 is connected to the point 19. This point 19 is connected to the audio switch 13, and a proper signal from either the timing circuit 18 or the tone squelch circuit 15 tends to cause the audio switch 13 to pass audio signals. The timing circuit 18 produces a signal or a pulse of selected time duration at its output immediately upon receipt of a detected signal from the noise squelch circuit 14 are applied to the control inputs of the audio switch 13 to cause the audio switch 13 to pass audio signals. Thus, means are provided for passing audio signals quickly, despite the delay introduced by the tone squelch circuit 15.

Operation of our timing circuit 18 is also illustrated in FIG. 2. The pulses of selected time duration are shown in FIGS. 2*d* and 2*g*. Typically, these pulses have a duration of approximately 225 milliseconds. In FIG. 2*d*, the timing circuit pulse is produced at the time T2 in response to the weakest carrier condition being detected, and as illustrated by the dashed line and arrow. This pulse continues from the time T2 for the selected duration until the time T7, which is ample to cause the audio switch 13 to pass initial data signals. It will be seen that at the time T7 when the timing circuit pulse ends, tone has already been detected at the time T6 so that signals continue to pass through the audio switch 13. With reference to FIG. 2*d*, the time duration of the timing circuit 18 is selected for the weakest carrier condition anticipated, and it should be sufficiently long so that it is slightly greater than the difference between the time T2 when carrier is detected and the time T6 when tone is detected, but not greatly in excess of that for reasons that will be explained. With such a selected time duration pluse, receipt and utilization of the data is assured.

FIG. 2*g* shows that the selected duration pulse begins at the time T1 in response to detection of the strongest anticipated carrier. Since this pulse begins at the time T1, it ends earlier, namely at the time T5. However, because of the strong carrier signal, tone has already been detected at the time T4 so that the data can pass through the audio switch 13.

The reason that the selected time duration should not be much greater than the duration indicated is so that it does not defeat the purpose of the tone detection. If the selected duration signal were too long, it would keep signals passing through the audio switch 13, even though the tone being received is not intended for that particular receiver. Hence, the selected duration signal should end shortly after the tone is detected.

The circuit as described will cause noise or sound to be produced by the loudspeaker 17 in response to data, whatever its characteristics may be. In some instances, this is desirable, because it demonstrates to the operator that data is being received. However, in other instances it may be undesirable. In those instances where the sounds of the data are undesirable, the output from the timing circuit 18 can also be applied as illustrated by the dashed line to the audio amplifier 16. This output can be utilized to prevent the amplifier 16 from passing signals during the selected duration signal, thereby preventing the unusual or sometimes annoying sounds of data from being heard. However, this is a matter of preference or choice.

While we have shown only one preferred embodiment for speeding up attack time so that data can be transmitted earlier in a tone coded system, persons skilled in the art will appreciate that modifications may be made. For example, the means for responding to the signals from the noise squelch circuit 14 and signals from either the tone squelch circuit 15 or the timing circuit 18 may be located at other points in a radio receiver, either before the audio switch 13 or after the audio switch 13. However, such a location is a matter of design or preference. And, of course, the speeded-up attack time can be used in tone-coded receivers which receive transmission of voice as well as or instead of data at the indicated times T3–T8 in FIG. *2a*, if receipt of such voice transmissions is desirable for some reason. Further, the need for two signals to operate the switch 13 suggests various logic and functions which can be utilized in a manner familier to persons skilled in the art. Various timing circuits with different time duration pulses can be provided. Therefore, while our invention has been described with reference to a particular embodiment, it is to be understood that modifications may be made without departing from the spirit of the invention or from the scope of the claims.

What we claim as new and desire to secure by Letters Patent of the United States is:

1. In a tone-coded radio receiver adapted to produce only those transmissions having a tone of selected frequency, said receiver having: a radio frequency circuit; a demodulator coupled to said radio frequency circuit; a control circuit having a signal path input coupled to said demodulator, a signal path output, and a control input; a tone filter having an input coupled to said demodulator and an output coupled to said control circuit control input for permitting signals to pass through said control circuit signal path in response to a demodulated tone of selected frequency; and a carrier detector coupled to said demodulator for detecting the presence of a received carrier; an improved circuit for speeding-up the response time of said radio receiver comprising:

a. a timing circuit having an input for detected carrier signals and an output or producing a signal of predetermined time duration in response to a detected carrier signal applied to said timing circuit input;

b. means connected to said timing circuit input and adapted to be connected to said carrier detector for supplying detected carrier signals to said timing circuit;

c. and means connected to said timing circuit output and adapted to be connected to said control circuit control input for permitting said control circuit signal path to pass signals in response to each of said signals of said predetermined time duration, thereby permitting said receiver to produce signals without delay by said tone filter.

2. In a tone-coded radio receiver adapted to produce only those tranmissions having a tone of seleccted audio frequency, said receiver having: a radio frequency circuit; a demodulator coupled to said radio frequency circuit; a control circuit having a signal path input coupled to said demodulator, a signal path output, and a control input; a carrier detector having an input coupled to said demodulator and an output; a tone filter having an input coupled to said demodulator and an output; and means coupling said control input of said control circuit to said carrier detector output and to said tone filter output for permitting signals to pass through said control circuit signal path in response to both a detected carrier signal and a demodulated tone of selected frequency; an improved circuit for speeding-up the attack time of said radio receiver comprising:

a. a timing circuit having an input for detected carrier signals and an output for producing a signal of selected time duration in response to a detected carrier signal applied to said timing circuit input;

b. means connected to said timing circuit input and adapted to be connected to said carrier detector output for supplying detected carrier signals to said timing circuit;

c. and means connected to said timing circuit output and adapted to be connected to said control input of said control circuit for permitting signals to pass through said control circuit signal path in response to both a detected carrier signal and a signal of selected time duration, thereby permitting said receiver to produce signals without delay caused by said tone filter.

3. The improved circuit of claim 2, and further comprising means coupled to said timing circuit output and adapted to be connected to the audio circuit of said radio receiver for blocking audible signals during the presence of said signal of selected time duration.

* * * * *